United States Patent
Suzuki

(10) Patent No.: US 9,731,878 B2
(45) Date of Patent: Aug. 15, 2017

(54) MEDICAL CAP AND A PRODUCING METHOD THEREOF

(75) Inventor: Keisuke Suzuki, Osaka (JP)

(73) Assignee: Naigai Kasei Co., Ltd., Osaka-shi (JP)

( * ) Notice: Subject to any disclaimer, the term of this patent is extended or adjusted under 35 U.S.C. 154(b) by 73 days.

(21) Appl. No.: 11/789,420

(22) Filed: Apr. 23, 2007

(65) Prior Publication Data

US 2008/0011707 A1 Jan. 17, 2008

(30) Foreign Application Priority Data

Apr. 25, 2006 (JP) .................. 2006-120401

(51) Int. Cl.
*B29C 70/68* (2006.01)
*B65D 51/00* (2006.01)
*A61J 1/14* (2006.01)

(52) U.S. Cl.
CPC .......... *B65D 51/002* (2013.01); *A61J 1/1406* (2013.01); *B29C 70/68* (2013.01)

(58) Field of Classification Search
CPC ........ B29C 70/68; B65D 41/20; B65D 41/62; B65D 51/18
USPC ......... 156/165, 245; 215/247, 249–251, 274, 215/296, DIG. 3; 264/241, 268, 255, 264/259; 604/415
IPC .................. B65D 41/20,41/62, 51/18
See application file for complete search history.

(56) References Cited

U.S. PATENT DOCUMENTS

| | | | |
|---|---|---|---|
| 3,900,028 A * | 8/1975 | McPhee .................. 604/415 |
| 4,084,718 A * | 4/1978 | Wadsworth ................ 215/247 |
| 4,254,884 A * | 3/1981 | Maruyama .................. 215/232 |
| 4,307,766 A * | 12/1981 | Tanokura .................. 604/408 |
| 4,496,343 A * | 1/1985 | Prosl et al. ................ 604/86 |
| 4,512,486 A * | 4/1985 | Kobayashi et al. ......... 215/249 |
| 4,741,446 A * | 5/1988 | Miller ..................... 215/247 |
| 4,984,415 A * | 1/1991 | Kuroda ..................... 53/478 |
| 5,125,921 A * | 6/1992 | Duschek .................. 604/415 |
| 5,656,112 A * | 8/1997 | Kuroda ..................... 156/69 |
| 5,718,682 A * | 2/1998 | Tucker .................. 604/288.02 |
| 5,853,094 A * | 12/1998 | Tanaka et al. ............. 215/247 |
| 6,994,699 B2 * | 2/2006 | Houwaert et al. ........... 604/408 |

(Continued)

FOREIGN PATENT DOCUMENTS

| CN | 1143492 A | 2/1997 |
| JP | 3169537 A | 7/1991 |
| JP | 6063105 A | 3/1994 |

(Continued)

OTHER PUBLICATIONS

Machine translation of JP2005-118185.*
Machine traslation of JP2003-104419.*
Machine translation of JP3166136.*

*Primary Examiner* — James N Smalley
(74) *Attorney, Agent, or Firm* — The Webb Law Firm

(57) ABSTRACT

In the medical cap comprising a plug 10 made of thermoplastic elastomer and an outer frame 20 made of synthetic resin, the side surface part of the plug is contacted with an inner wall 211 of the side circuit part of the outer frame in a non-fused state and is held in a state with pressure applied from the leg part of the outer frame 22. As a result, the wetted surface of the plug is not flat shaped but has an inclination downward to the circle center. Protrusion 14 can also be provided on the wetted surface and in such a case, the bottom part of the protrusion part that is one part of the wetted surface has an inclination downward to the circle center.

10 Claims, 11 Drawing Sheets

(56) References Cited

U.S. PATENT DOCUMENTS

| 7,354,536 B2* | 4/2008 | Hiranuma | 264/1.32 |
| 2008/0011707 A1* | 1/2008 | Suzuki | 215/296 |

FOREIGN PATENT DOCUMENTS

| JP | 8317961 | A | | 12/1996 | | |
| JP | 3166136 | B2 | * | 5/2001 | ............. | B65D 51/18 |
| JP | 2002-143270 | A | | 5/2002 | | |
| JP | 2003104419 | A | * | 4/2003 | ............. | B65D 51/18 |
| JP | 2004083028 | A | | 3/2004 | | |
| JP | 2005-118185 | A | | 5/2005 | | |
| JP | 2005199031 | A | | 7/2005 | | |
| JP | 2007014513 | A | | 1/2007 | | |

* cited by examiner

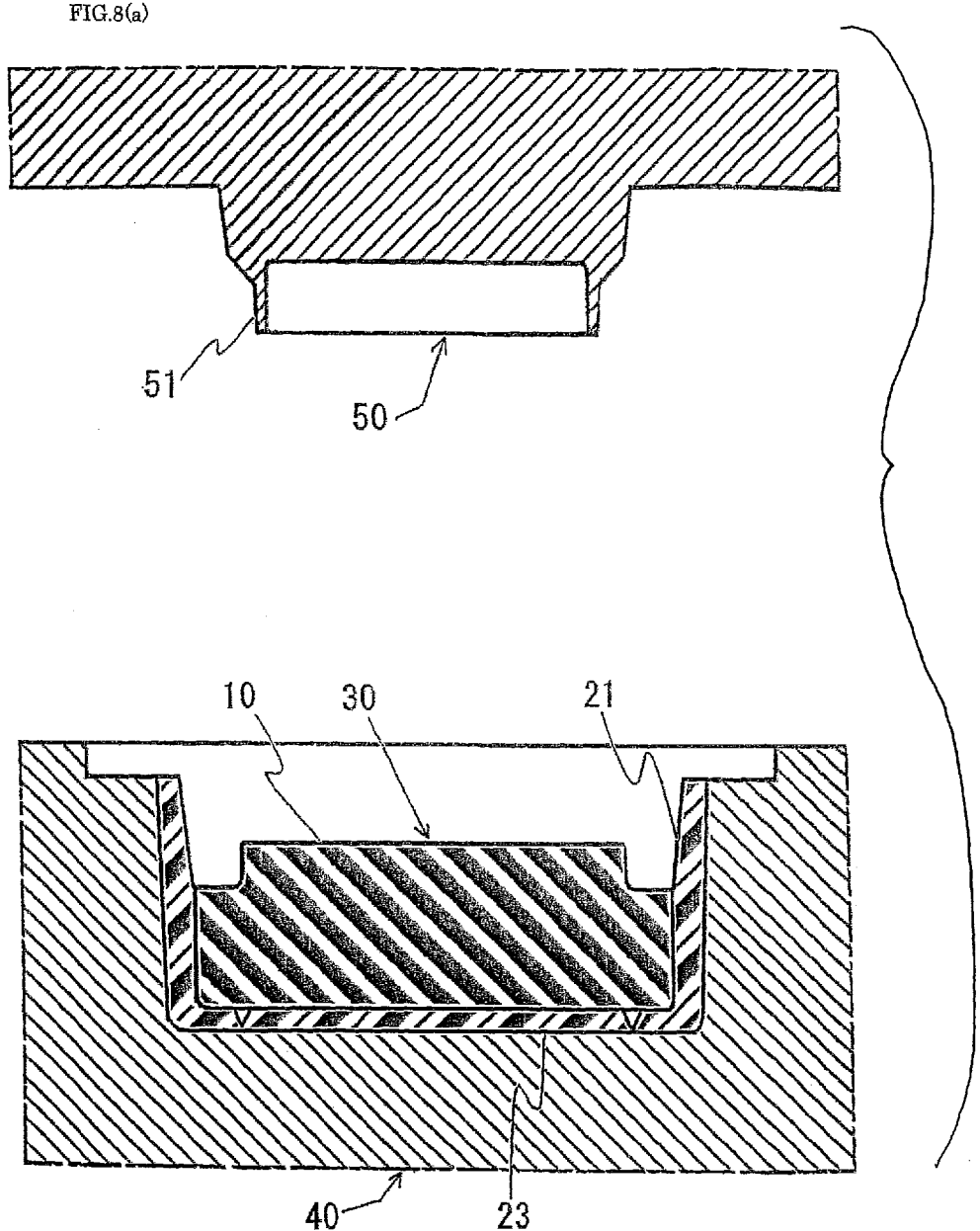

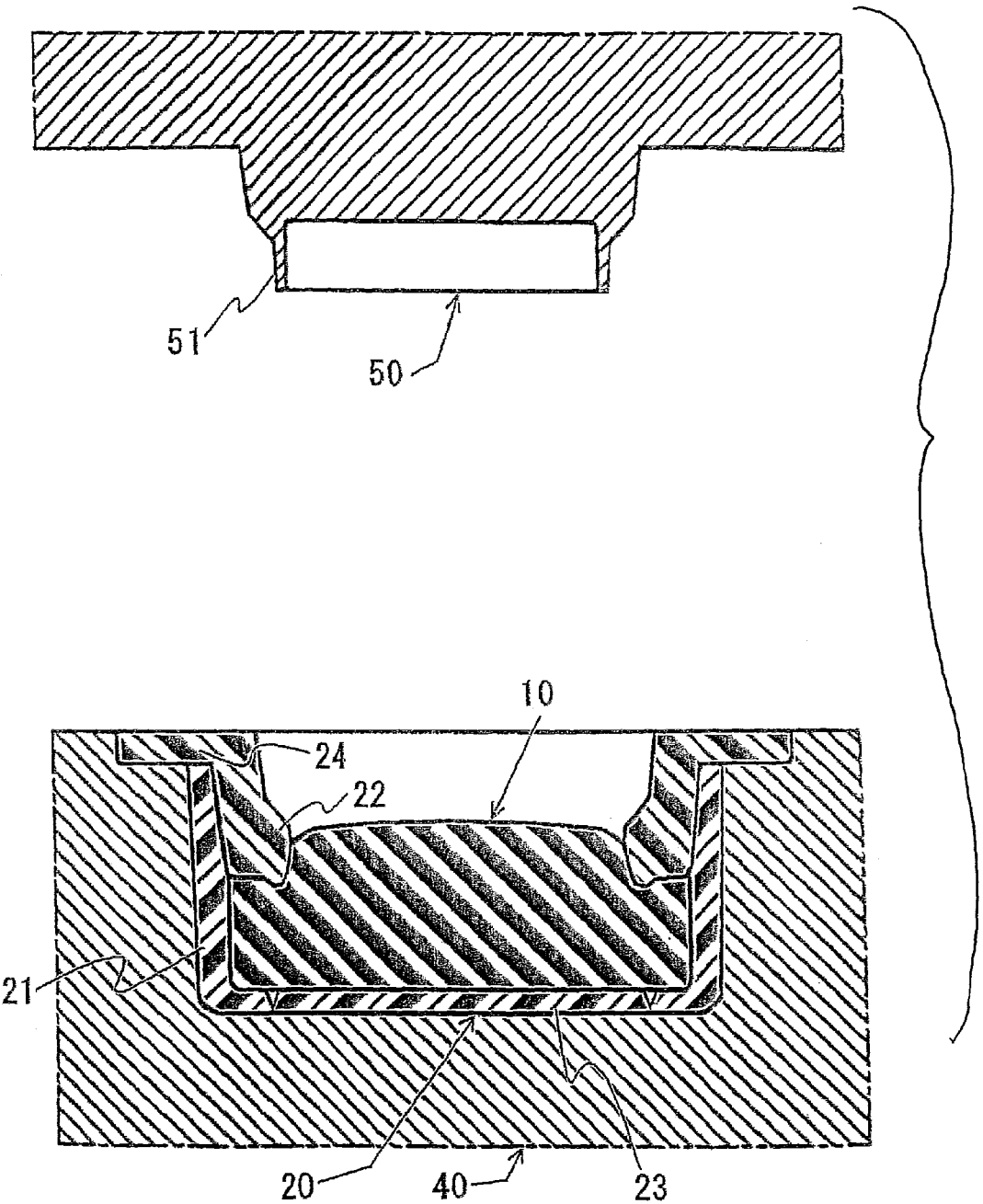

MEDICAL CAP AND A PRODUCING METHOD THEREOF

The description of this application claims benefit of priority based on Japanese Patent Application No. 2006-120401, the entire same contents of which are incorporated by reference herein.

BACKGROUND OF THE INVENTION

Field of the Invention

The present invention relates to medical caps used for chemical bottles, infusion container bottles, and the like.

Description of the Prior Art

Conventionally, there have been caps for chemical bottles or infusion bottles used for intravenous drips in medical fields, such as a rubber plug cap, and a cap comprising a plug with a substantially columnar shape for needle sticking made of a rubber or a thermoplastic elastomer resin and an outer frame that holds said plug for needle sticking since it is required to take out the medical solutions and the like by needles. For medical caps used for these infusion bottles and the like, a sealing property is required when attached to bottles from the view point of preventing leakage of the medical solutions. Here, the plug made of a rubber component is used, and it is excellent in a re-sealing for repeated needle sticks, but it requires a vulcanizing process during the producing process that causes contamination of production environment, and so, it causes high production costs since it requires a post process such as cleansing and the like. In addition, general structures for the rubber component used to be that the film part made of the same or the same kind of a material is provided as that of the wetted surface part of the cap body in the wetted surface (lower bottom part) of the plug, or that resins are laminated on the plug and fused with the cap body, in order to prevent the cap from falling off at the time of needle sticks. Due to these factors, further high production cost has been caused by the caps using the rubber plugs.

On the other hand, in the case of the plugs whose components are thermoplastic elastomer resins, since they can be molded under clean environment, no cleansing process is required. In addition, a series of processes can be incorporated in a production process line of caps. Further, since a molding method enables the plug itself to be fused with a cap body, it is not always necessary to provide such a structure with the above mentioned film part or conduct laminating process. Therefore, in mass production, cost performance is more advantageous than that of rubber component caps. However, since thermoplastic elastomer resins have larger residual distortion than rubbers and are inferior in rubber elasticity, there used to be the problem including slipping out of the needles when sticking them or lack of a re-sealing property for the prevention of liquid leakage after needle sticks.

As solving measures for this problem, we have proposed the medical caps with improved rubber characteristics and an excellent re-sealing property by making the structure of the medical cap so that the wetted surface of the plug and the upper part of the holding part of the bottom surface of the outer frame are fused to each other and that the side surface of said plug and the inner wall of the side circuit part of said outer frame contact each other in a non-fused state (Patent Document 1: Japanese Patent Laid-Open Publication No. 2005-118185).

As another approach to solve the above mentioned problem, the technique that improves the physical balance such as a sealing property at a time of needle sticks, power to hold a needle, coring, a re-sealing property of holes after needle removal and the like that are required for a plug for infusion by using a thermoplastic elastomer composition whose main material is a styrene-based hydrogenated block copolymer in which the molecular weight and its distribution are within the specific range and by integrally forming the plug in a state where a sealed body comprising said thermoplastic elastomer is pressurized in the horizontal direction by the tubular cap body made of plastic is disclosed (Patent Document 2: Japanese Patent Laid-Open Publication No. 2002-143270).

Then, as stated in the Patent Document 2, to the medical caps having a structure stated in the Patent Document 1, the medical cap might be considered to be prepared with a further improved property including the re-sealing property and the like by applying pressure to the plug in the horizontal direction.

However, in the technique of the Patent Document 1, unlike the medical caps stated in the Patent Document 2, unless it is so structured that the side surface of the plug is not fused to the inner wall of the side circuit part of the outer frame, the effect that said structure has cannot be obtained. It is not easy to produce the medical cap having a structure of pressure applied in the horizontal direction of the plug, while maintaining the non-fused state between the side surface of the plug and the inner wall of the side circuit part of the outer frame. One method is considered, that is, after an inner diameter of an inner side aperture of the outer frame is made smaller than the diameter of the plug, said plug is forced into said aperture and then coupled thereto thereby applying pressure to the plug in the horizontal direction. However, since it is difficult to conduct such operations by the machine operation in the process of producing caps, mass production is not available. And even if such operations are available, they cannot be applied for producing products practically since it is considered that the plugs may get damaged, and there is high risk of generating a defective sealing property thereby lowering yield when the plugs are deformed under said operation.

SUMMARY OF THE INVENTION

In order to solve the above mentioned problem, in the medical caps of the present invention has the most important characteristics in that (i) the side part of the plug and the inner wall of the side circuit part of the outer frame are contacted in a non-fused state and that (ii) the plug is held so that the pressure is applied thereto from the leg part of the outer frame. In addition, as a method of producing such medical caps, the most significant means of the present invention is that said leg part of the outer frame is formed from outside of the ringed protrusion of an upper die mold in a state that the vicinity of periphery of the lower bottom face of the plug (or the protrusion of the plug) is kept to be pushed down by said upper die mold.

That is, the present invention relates to a medical cap, wherein said plug has an embodiment of having the needle stuck surface (upper bottom part), the wetted surface (lower bottom part), and a side surface part that is positioned between said needle stuck surface and said wetted surface, and typically, substantially columnar or substantially convex with a protrusion part provided at a center part of the wetted surface, and said outer frame has at least a side circuit part holding the side surface part of said plug from the side surface direction by the inner wall, and a protrusion of the side circuit part being formed by extending downward beyond the contact position with the wetted surface of said plug, and a leg part whose upper part is fused with a peripheral part of the wetted surface of said plug and whose outer side surface is fused with the inner surface of the protrusion of the side circuit part of said outer frame, the side surface part of said plug and the inner wall of the side circuit part of said outer frame are contacted in a non-fused state, the wetted surface of said plug has an inclination to the circle center, and said plug is held in a state with pressure applied from the leg part of said outer frame.

Moreover, it is further preferable that the shape of the wetted surface of the plug is provided with a columnar protrusion part at the center part instead of having a flat surface since the pressure applied to the plug from the leg part of the outer frame becomes more direct.

As a method for producing the above mentioned medical cap, the present invention relates to a molding method of the medical cap, comprising the steps of preparing the cap-molding intermediate with said plug inserted in said peripheral part of the outer frame, said cap-molding intermediate being held in the lower die mold with the needle stuck surface down, the upper die mold having the ringed protrusion, molding the leg part of said outer frame from outside of the ringed protrusion of said upper die mold, with said cap-molding intermediate keeping the state that the peripheral vicinity of the wetted surface of the plug is pushed down by said upper die mold, fusing the outer side surface of the leg part of said outer frame with the inner wall of the protrusion of the peripheral part of said peripheral part of the outer frame keeping the state that the pressure is applied to said plug from the leg part of said outer frame by the molding of the leg part of said outer frame, and at the same time, fusing said upper part of said leg part and periphery of the wetted surface of said plug, by the molding of the leg part of said outer frame.

In addition, the same kind of effect can be obtained when said cap-molding intermediate is held with the needle stuck surface up and the role of said upper die mold and the role of said lower die mold are replaced.

BRIEF DESCRIPTION OF THE DRAWINGS

FIG. 7 (b) is a schematic view of a leg part of an outer frame in a state of a cap of FIG. 1;

FIG. 8 (b) is a schematic view of a vertical cross section showing a producing process (during fusion-molding) of the cap of FIG. 1;

FIG. 8 (c) is a schematic view of a vertical cross section showing a producing process (at the time of completing fusion-molding) of the cap of FIG. 1;

FIG. 10 (b) is a schematic perspective view of another embodiment of the upper die mold;

FIG. 12 (b) is a schematic view of a vertical cross section showing a leakage test (1)—A of a puncture needle.

DESCRIPTION OF THE PREFERRED EMBODIMENTS

Hereinafter, the explanation goes on for the medical caps of the present invention using figures. However, the present invention is not limited to the embodiments shown in the figures.

Figure 1:
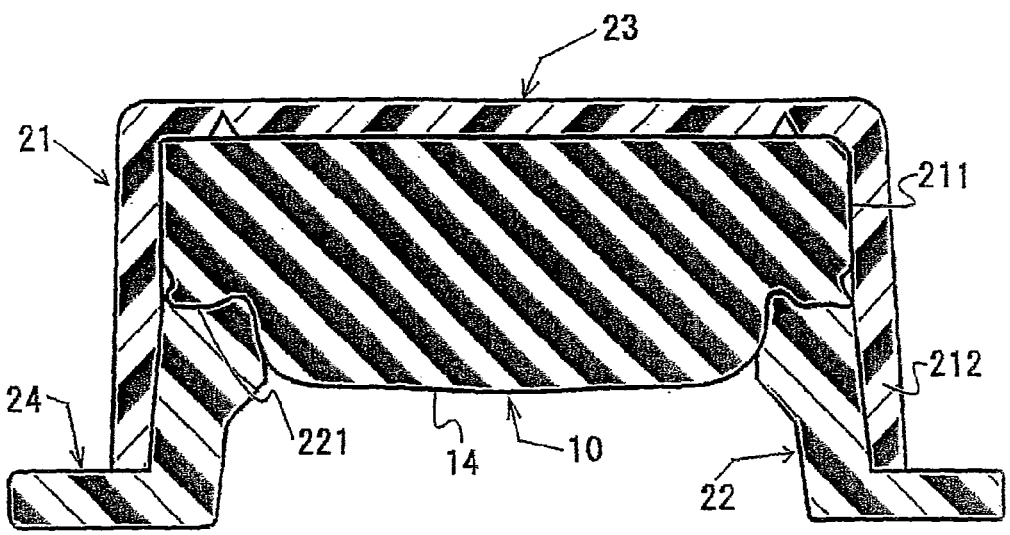
FIG. 1 is a schematic view of a vertical cross section showing one embodiment of a medical cap of the present invention.
Figure 2:
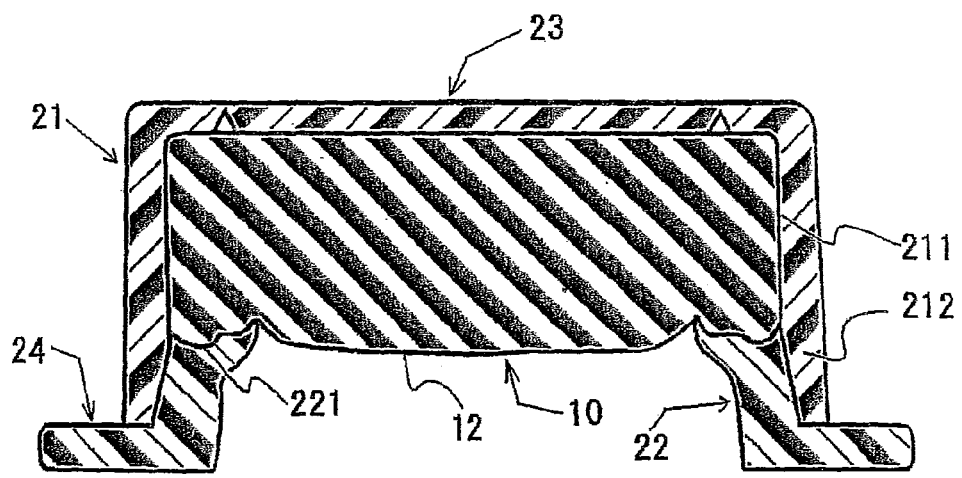
FIG. 2 is a schematic view of a vertical cross section showing another embodiment of the medical cap of the present invention.
Figure 3:
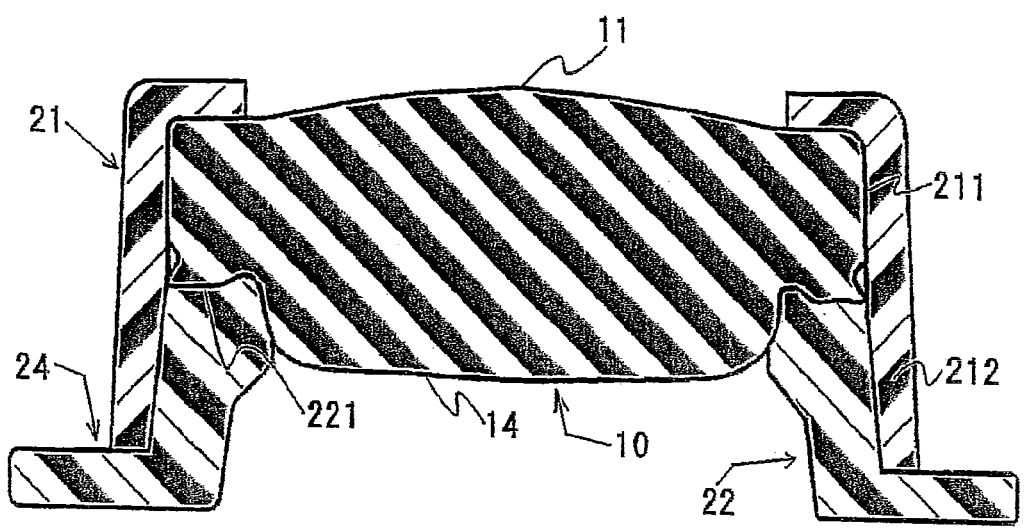
FIG. 3 is a schematic view of a vertical cross section showing another embodiment of the medical cap of the present invention.
Figure 4:
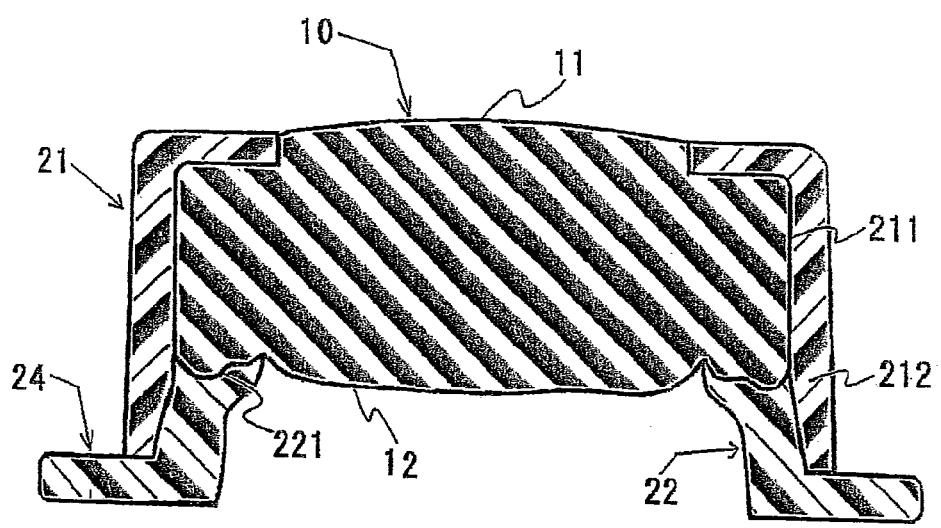
FIG. 4 is a schematic view of a vertical cross section showing another embodiment of the medical cap of the present invention.
Figure 5:
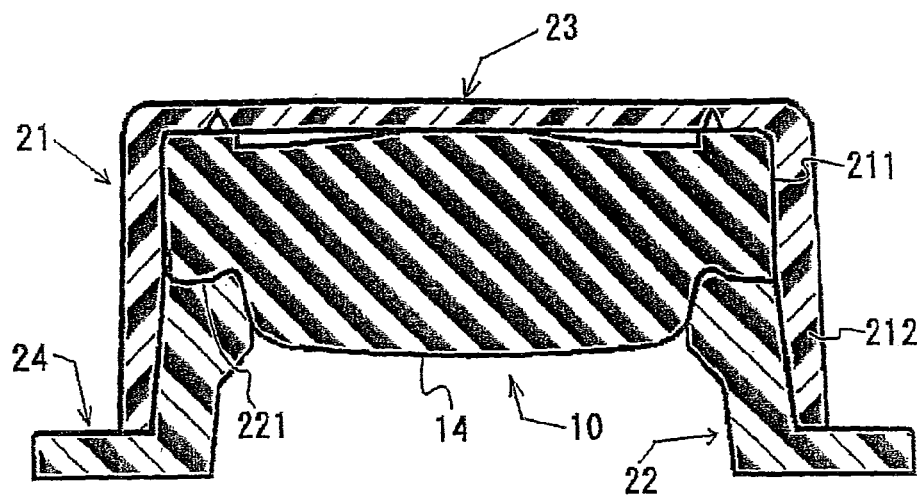
FIG. 5 is a schematic view of a vertical cross section showing another embodiment of the medical cap of the present invention.
Figure 6:
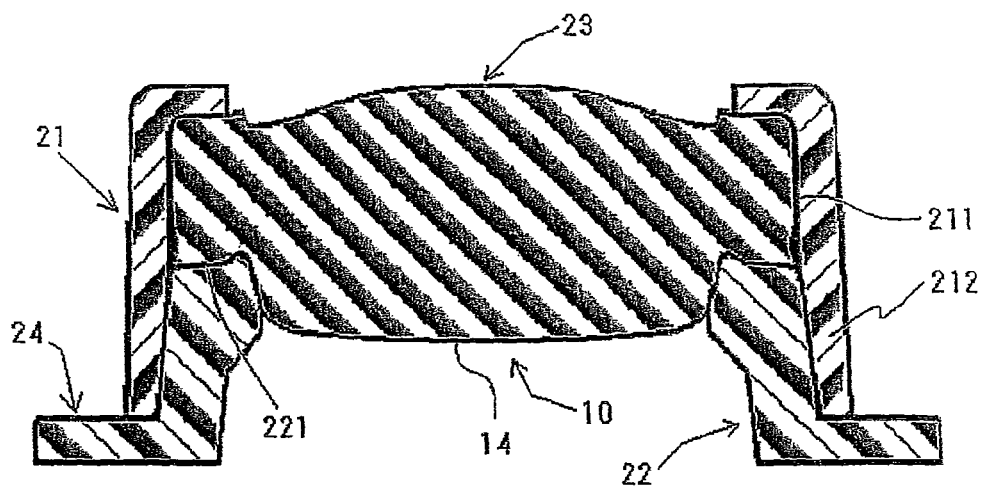
FIG. 6 is a schematic view of a vertical cross section showing another embodiment of the medical cap of the present invention.

FIG. 1 is a schematic view of a vertical cross section showing one embodiment of the medical cap of the present invention. In the FIG. 1, such an embodiment, with a columnar protrusion part, that the shape of the plug is substantially convex with a pulltop 23 provided at the position that includes the center of the wetted surface of the plug is shown. FIGS. 2 to 6 are schematic views of vertical cross sections showing other embodiments, respectively. FIG. 2 shows the embodiment of a substantially columnar plug whose wetted surface is substantially flat with a pulltop 23 provided. FIG. 3 shows such an embodiment, with a columnar protrusion part, that the shape of the plug has no pulltop provided at the position that includes the center of the wetted surface of the plug is shown. FIG. 4 shows the embodiment in which the shape of the plug having a columnar protrusion part is substantially columnar having a convex shape in the side of the needle stuck surface at the position that includes the center of the surfaces of the needle stuck surface with no pulltop provided. In FIG. 5, a columnar protrusion part is provided at the position that includes the center of the wetted surface of the plug, while on the other hand, a ringed protrusion part is provided at the peripheral position of the needle stuck surface of the plug with a pulltop 23 provided. In FIG. 6, a columnar protrusion part is provided at the position that includes the center of the wetted surface of the plug, while on the other hand, a ringed protrusion part is provided at the peripheral position of the needle stuck surface of the plug with no pulltop provided. FIGS. 7 (a) and (b) are schematic views of the plug 10 and of the leg part 22 of the outer frame in the state of the cap of FIG. 1, respectively.

Figure 8B:
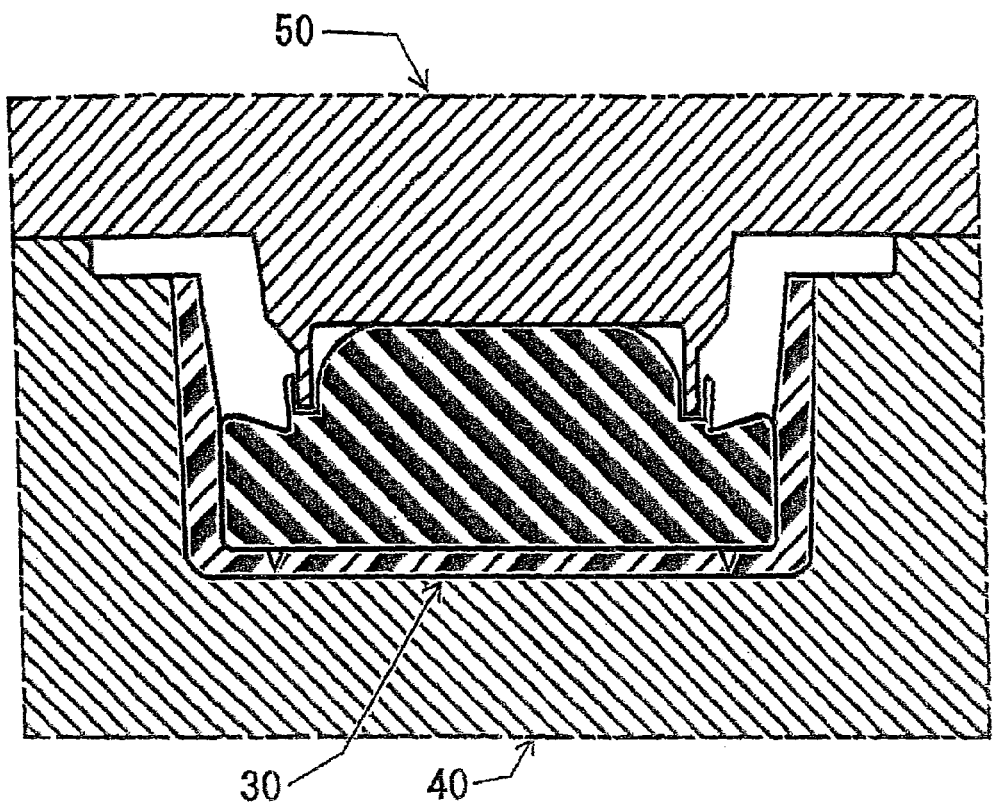
FIG. 8 (a) is a schematic view of a vertical cross section showing a producing process (before fusion-molding) of the cap of FIG. 1.

FIG. 8 (a), (b), and (c) are schematic views of vertical cross sections showing a part of a producing process of the cap of the embodiment of FIG. 1, respectively. FIG. 8(a) shows an embodiment before fusion-molding of a molding intermediate 30 and a leg part 22 of the outer frame, FIG. 8(b) shows an embodiment during fusion-molding, and FIG.

Figure 9:
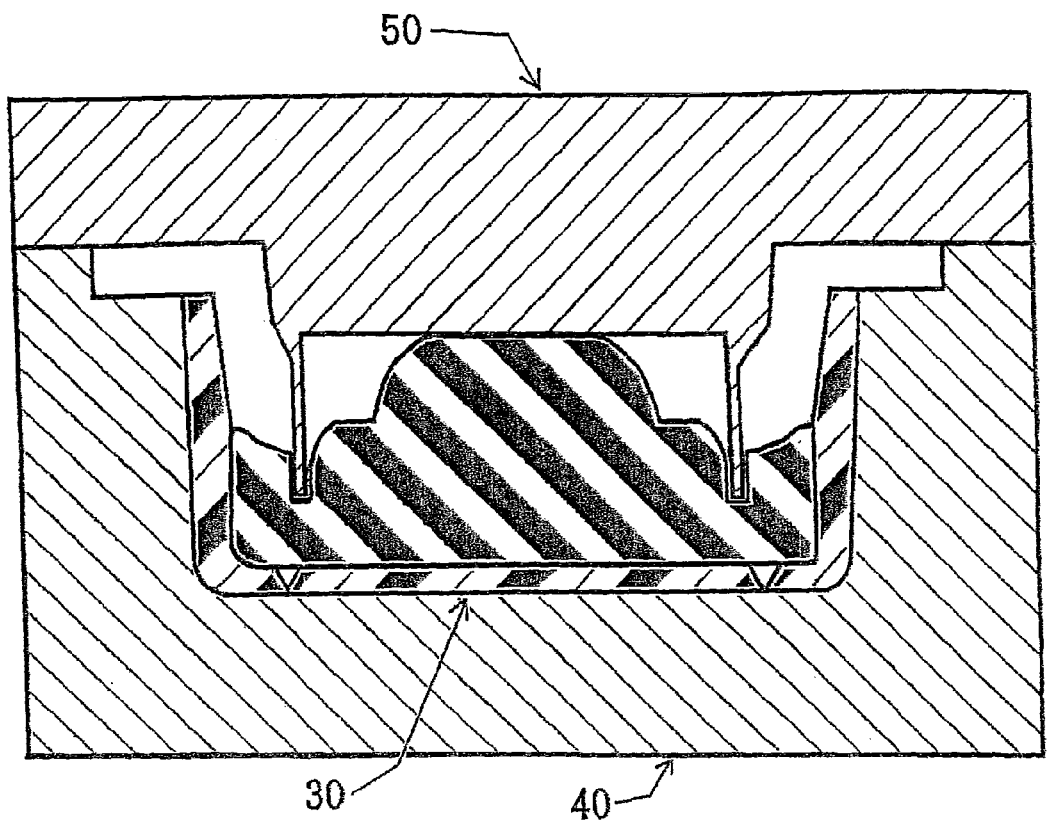
FIG. 9 is a schematic view of a vertical cross section showing another embodiment of the producing process (during fusion-molding) of the cap of the present invention.
Figure 10A:
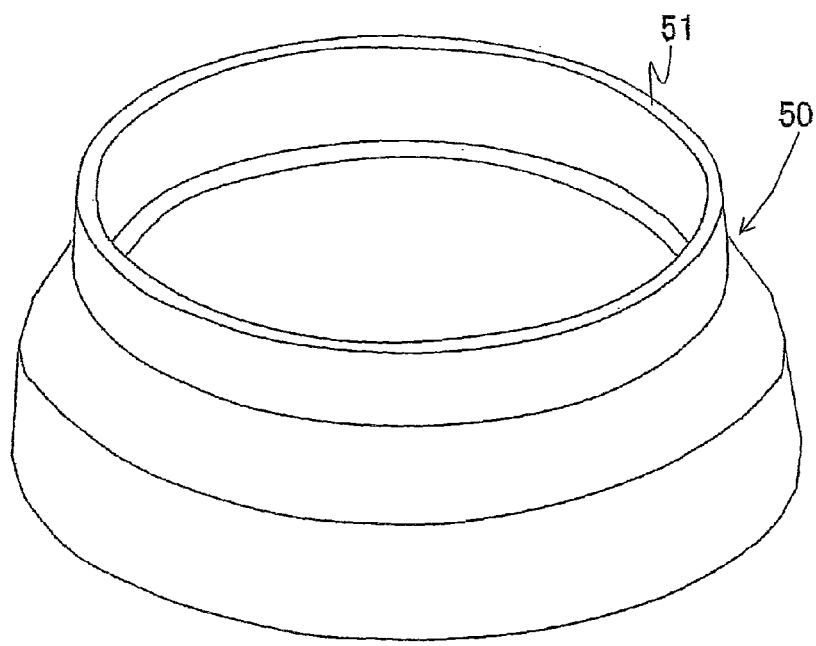
FIG. 10 (a) is a schematic perspective view of an upper die mold.
Figure 10B:
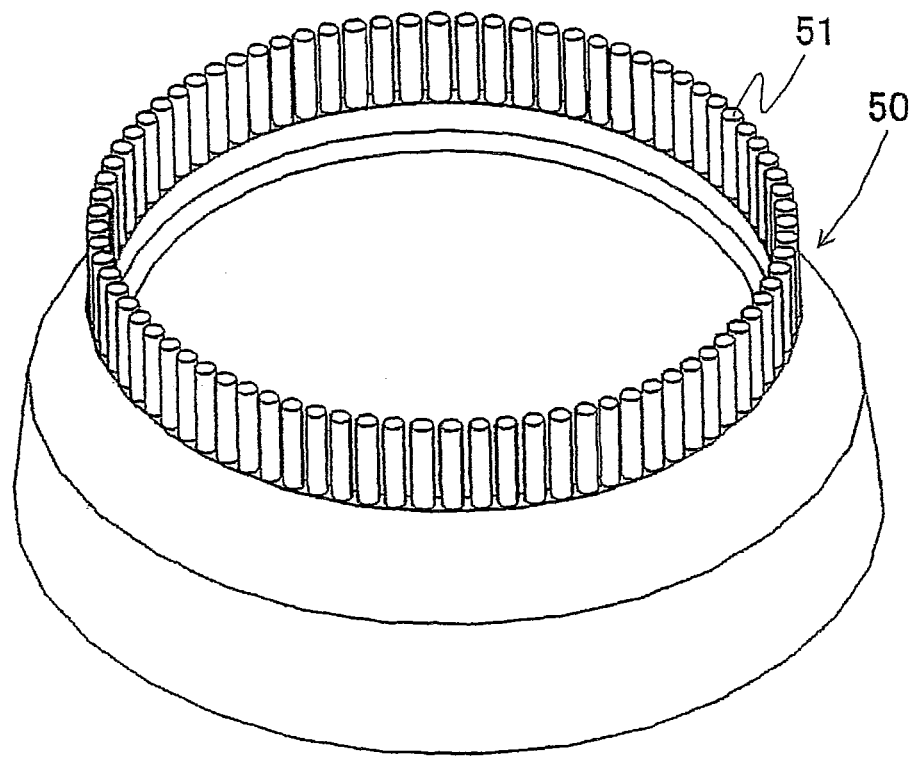
Figure 11:
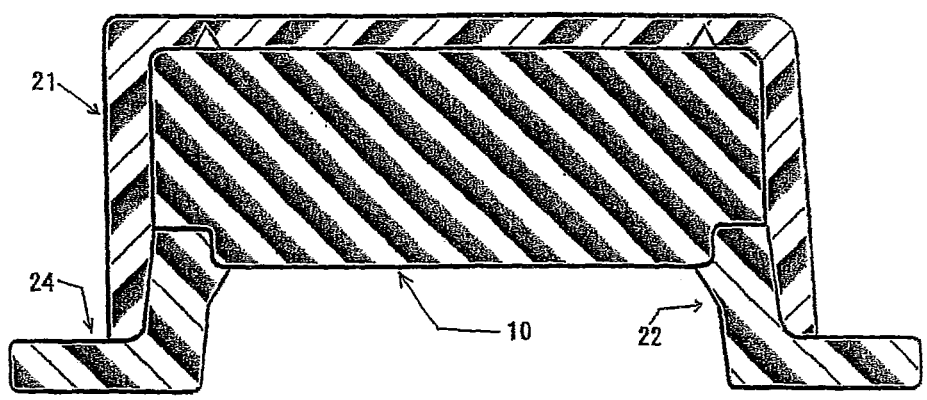
FIG. 11 is a schematic view of a vertical cross section showing an embodiment of the medical cap of the reference example.

8(c) shows an embodiment at the time of completion of fusion-molding. FIG. 9 is a schematic view of a vertical cross section showing the other embodiment of the cap of the present invention during the fusion-molding. FIGS. 10 (a) and (b) are schematic perspective views of upper die molds used in the producing process of the present invention. FIG. 11 is a schematic view of a vertical cross section showing an embodiment of the medical cap produced as a reference example that applies no pressure to the plug 10 of the horizontal direction component.

(Medical Caps)

The medical cap of the present invention essentially comprises a plug 10 of a thermoplastic elastomer and an outer frame 20 of a synthetic resin. Other useful, additional elements may be included such as pull tops, flanges and the like. The pull tops, flanges, and the like may also be formed as a part of the outer frame 20.

(Materials)

As materials used for the plug 10, thermoplastic elastomers can be used. To be specific, the thermoplastic elastomers such as olefin series, styrene series, polyurethane series, polyester series, polyvinyl chloride series, polybutadiene series and the like can be exemplified, however, they are not limited to these. Among them, the thermoplastic elastomers hydrogenated to conjugated diene series elastomers (SEBS, SBPS, HSBR, SEBR, and CEBC) can preferably be used.

In addition, although the thermoplastic elastomer materials are much hygienic compared with rubber materials, depending on medical solutions to be used, a laminating process can also be made on a wetted surface (lower bottom part) 12 of the plug 1. Generally, for a laminating process, the same kind of a resin as a holding part of a cap outer frame 20 or a container to be attached can be used. This can make internal side of a container or the wetted surface of the cap, with which the medical solutions contact, made of the material with a single or a similar property.

As the materials used for the outer frame 20, among synthetic resins, such materials with established safety for medical uses are satisfactory. Among them, thermoplastic resins can generally be used. To be specific, resins conventionally used for medical purposes such as polyethylene, polypropylene, PET resins, and the like, but they are not limited to these. It is preferable that the content used for side circuit part 21 and the leg part 22 of the outer frame 20 are the same or compatible respectively since the outer frame 20 is molded by fusing both of the outer frame 20 and the leg part 22. Also, optional components such as colorants and the like can be added to either one or both of the side circuit part 21 and the leg part 22 of the outer frame 20.

(Plugs)

The plug 10 used for the present invention can be molded by such known methods as injection molding, and the like. The plug 10 has the needle stuck surface 11, the wetted surface 12, and the side surface part 13 that is positioned between said needle stuck surface 11 and said wetted surface 12. For information, terms of a needle stuck surface 11 and a wetted surface 12 are terms for showing the positional relationship of the medical caps and in the wetted surface 12, the peripheral part that is fused with the leg part 22 of the outer frame does not contact with medical solutions such as intravenous drips, actually. In addition, the terms do not mean to exclude the structure of the medical caps even when they are the medical caps whose structure does not directly make the wetted surface 14 be wetted actually, by, for example, providing a surface such as synthetic resin further outside of the needle stuck surface 11 or laminating on a plug surface and the like.

The needle stuck surface 11 or the wetted surface 12 is not necessarily flat and on either surface or on both surfaces, protrusion parts can be provided. FIG. 1 is an embodiment that has a columnar protrusion part 14 at the position that includes the center of the wetted surface 12 of the plug 10. FIG. 4 is another embodiment that has a columnar protrusion at the position that includes the center of the needle stuck surface 11, and FIGS. 5 and 6 are embodiments that have ringed protrusion parts at the peripheral position of the needle stuck surface 11 of said plug 10. When both the needle stuck surface 11 and the wetted surface 12 are flat, the plug 10 is substantially columnar shaped and when the embodiment provided with a columnar protrusion part at the position that includes the center of either the needle stuck surface 11 or the wetted surface 12 is employed, the plug 10 is substantially convex.

Further, as shown in the embodiments of FIGS. 3 and 4, such embodiments with no pulltops provided can be prepared. Moreover, on the needle stuck surface, engraved marks such as marks for needle sticks, ornamental protrusions and the like can be provided as well.

The wetted surface 12 of the plug 10 has an increased inclination to the circle center, that is downward to the circle center. It is so called plate-shaped or mortar-shaped. This is, as a result that the initially flat-shaped wetted surface 12 is deformed, due to the pressure applied from the outer frame 22 to the peripheral part of the plug 10, the inclination downward to the circle center is formed, as mentioned later.

Further, in the case of the medical caps whose embodiment has a columnar protrusion part 14 at the position that includes the center of the wetted surface of the plug 10, the bottom surface of said protrusion part 14 that is a part of the wetted surface 12 has an inclination downward to the circle center.

As heretofore mentioned, in the plug 10 used for the present invention, the wetter surface 12 or the bottom surface of the columnar protrusion 14 essentially has an inclination downward to the circle center.

In particular, in the case of the medical caps whose embodiment includes providing a ringed protrusion part at the peripheral position of the needle stuck surface of the plug 10 as shown in the embodiments of FIGS. 5 and 6, the retaining force of sticking needles is further increased. The reason is considered to be the increased rate of the horizontal component that contributes to the pressure.

In addition, in the embodiment with no pull tops provided, in many cases, the needle stuck surface 11 of the plug 10 likewise, has an inclination upward to the circle center as in the embodiment of FIGS. 3 and 4. On the other hand, when the plug is molded with no pressure applied from the leg part 22 of the outer frame to the peripheral part of the plug 10, neither the wetted surface of the plug 10 nor the needle stuck surface has an inclination to the circle center as shown in FIG. 11 of the reference example, since the plug 10 is not deformed.

(Outer Frames)

Outer frame 20 used for the medical caps of the present invention at least has a side circuit part 21 and a leg part 22. As a part of the outer frame, a flange 24 or a pulltop 23 may be provided as mentioned above.

The side circuit part 21 holds the side surface part 13 of the plug 10 with its inner wall 211 from the side surface direction. But, the holding is conducted in a non-fused state contact between the side surface part 13 of the plug body and the inner wall 211 of the side circuit part of the outer frame. By making this non-fused state, removal of needles or liquid leakage can be prevented at the time of use. In other words, since side surface part 13 of the plug is in a free state without being fixed by the outer frame 20, when needles are stuck, the force that pushes the plug outward can be absorbed. Here, since a force that holds a needle is applied to the needle stuck through the plug 10 from the outer frame 20 by counteraction, the removal of the needle can be prevented. Also, when the needle is removed, since the plug 10 pushed outward from the outer frame 20 is subject to the force that pushes inward from the outer frame 20 that contacts with a side surface, the hole generated by the needle can be blocked off and therefore, the re-sealing property of the plug can be improved.

In addition, the side circuit part 21 extends downward beyond the lower bottom part of said plug 10, thereby forming a protrusion 212 of the side circuit part. Said protrusion 212 of the side circuit part takes a role of overlap width, so to speak, so as to fuse the side circuit part 21 and the leg part 22 for forming an integrated outer frame 20. In other words, in the protrusion 212 of the side circuit part, the side circuit part 21 and the leg part 22 are not molded at once, but the protrusion 212 of the side circuit part is required as a part to employ a method of forming an integrated outer frame 20 by molding the side circuit part 21 first, followed by molding the leg part 22.

As mentioned above, the leg part 22 is fused with the side circuit part 21 thereby forming the integrated outer frame 20, and also, its upper part 221 is fused with the peripheral part of the wetted surface 12 of the plug. When the columnar protrusion part 14 is provided on the wetted surface, it is also fused with the side wall of said protrusion part 14.

In addition, the leg part 22 applies pressure to the plug 10. In practice, a later mentioned producing method and the like are employed and when the leg part 22 is molded in a state where the upper die mold 50 applies pressure to the plug 10, said leg part 22 is fused with both the side circuit part 21 of the outer frame and the plug 10 maintaining the pressurized state, and therefore, consequently, said leg part 22 imparts pressure to the plug 10 after said upper die mold 50 is removed.

Figure 7A:
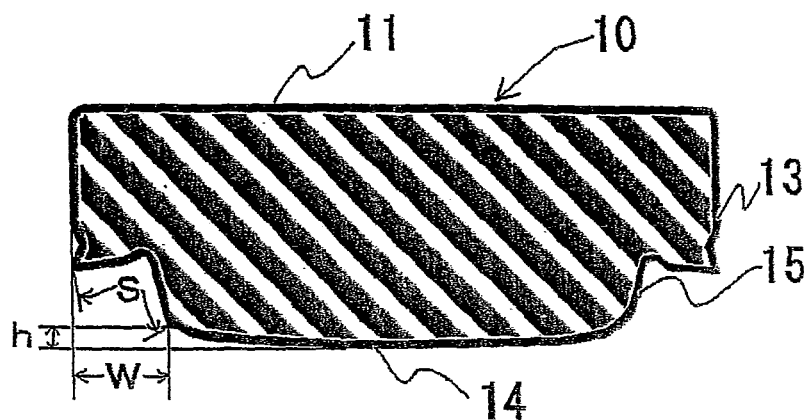
FIG. 7 (a) is a schematic view of a plug in a state of a cap of FIG. 1.

Although it is difficult to directly measure the degree of pressure applied to the plug 10 by the leg part 22, it is considered as one indication to research on the degree of deformation of the wetted surface 12 of the plug 10 by said pressure compared with the flat state thereof without any pressure applied. In the present invention, it is preferable that the protruding amount h (absolute figure) is 0.1 to 3.0 mm, which is the difference in height between height of the contact terminal downward of the plug 10 and the leg part 22 of the outer frame that is illustrated in FIG. 7(a) which is the schematic view of the plug 10 in the state of FIG. 1 and height of the lower bottom part of the wetted surface 12 at the central part of the circle. The effect of the present invention cannot be shown enough by too small projecting amount h, because it shows that satisfactory pressure is not applied to the plug 10.

Figure 7B:
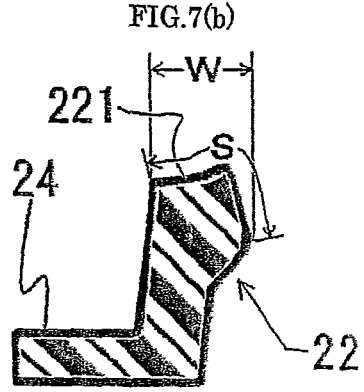

Since the upper part 221 of the leg part is a region that is fused with the plug 10, it is preferable that said region is broad in order to maintain the holding ability of the pressure applied to the plug 10. To be specific, as shown in FIG. 7(a) and FIG. 7(b) which is the schematic view of the leg part 22 of the outer frame in the state of FIG. 1, in the vertical cross section of the medical cap of the present invention, the fused length s of the region fused with the plug 10 is preferably not less than 1 mm and further preferably not less than 2 mm.

On the other hand, since sticking needles is impossible from on the position of the leg part 22, when said region is made too wide, the position of sticking needles gets limited thereby causing the problem when the needles are used. In order to avoid this problem, as shown in FIGS. 7(a) and 7(b), it is preferable that in the position of the leg part 22 that is fused with the plug 10, the length w in the horizontal direction is set to be within 8 mm to a circle center from the side part 13 of the plug.

(Molding Method)

Molding of the above mentioned medical caps can be efficiently prepared following the method below. As one example, the explanation is hereafter made on molding the medical caps whose embodiment has the columnar protrusion part 14 at the position that includes the center of the wetted surface 12 of the plug 10. First, the plug 10 is inserted inside of the peripheral part 21 of the columnar outer frame, thereby obtaining the cap-molding intermediate 30. Since the circumference diameter of the plug 10 is not necessarily set to be larger than the inner circumference diameter of the peripheral part 21 of the outer frame here, said inserting operation can be conducted by a general method. In addition, for molding of the peripheral part 21 of the outer frame, known molding methods, can be utilized such as extrusion molding, and the like.

The obtained cap-molding intermediate 30 is, as shown in FIG. 8(a), held in the lower die mold 40 upside down. To cite a vertical molding machine as one example, the die mold generally has a shape that the void portion is molded so that when the lower die mold (fixed die mold) and the upper die mold (movable die mold) are coupled, its void portion equals to the cavity. In the case of the upper die mold 50 of the present invention, as shown in FIGS. 10(a) and 10(b), the upper die mold 50 having the ringed protrusion 51 is used. In other words, the void portion that is not the cavity is provided in the vicinity of the circle center. When push-down pressure is applied to the peripheral vicinity of the bottom surface of said columnar protrusion part 14 by the upper die mold 50 with such a shape, as shown in FIG. 8(b), the wetted surface 12 of the plug 10 gets deformed to have an inclination downward to the circle center. Thus, when the leg part 22 of said outer frame is molded from the outside of the ringed protrusion 51 of said upper die mold 50, while maintaining the deformation of the plug 10, keeping the state that the leg part 22 applies pressure to the plug 10, the outer side surface of the leg part 22 of the outer frame and the inner wall of the peripheral protrusion 212 of the peripheral part of said outer frame 21 are fused and at the same time, the upper part of the leg part 22 and the peripheral part of the peripheral part of said wetted surface 12 are fused. And then, as shown in FIG. 8(c), even when the upper die mold 50 is removed, the plug body 10 of the medical cap in which the leg part, the peripheral part 21, and the plug 10 are integrated, is held in a state with pressure applied from the leg part 22 of said outer frame.

For information, although here, the embodiment in which the peripheral vicinity of the bottom surface of the columnar protrusion part 14 is pushed down by the ringed protrusion 51 of the upper die mold 50 as shown in FIG. 8(b), the peripheral vicinity of the wetted surface 12 may be pushed down as shown in FIG. 9 or even when the embodiment with no columnar protrusion part 14 provided, the peripheral vicinity of the wetted surface 12 may be pushed down.

The ringed protrusion 51 of the upper die mold 50 may be one continuing ringed protrusion as shown in FIG. 10(a), and may be the ringed protrusion as a whole by making a plurality of pins with substantially the same height stand on the circumference as shown in FIG. 10 (b).

The preferable height of the ringed protrusion 51 of the upper die mold 50 is 0.5 to 4.0 mm and the preferable width is 0.2 to 3.0 mm. When the height of the ringed protrusion is too low, the inclination downward to the circle center of the wetted surface 12 of the plug gets limited and therefore, the effect that the present invention has is hard to obtain. In addition, the same kind of an adverse effect occurs when the ringed protrusion 51 is too wide. On the other hand, when the height of the ringed protrusion 51 is too high, mold clamping gets impossible, and when the width of the ringed protrusion 51 is too narrowed, the problem related to the intensity of the die mold may arise.

For information, if said cap-molding intermediate can be held with the needle stuck surface 11 up, by replacing the role of said upper die mold and said lower die mold, the medical cap of the present invention can be molded as well.

For further information, the molding of the above mentioned leg part 22 is two-color molding and the known molding methods can be employed. However, the molding is more easily conducted by the extrusion molding.

(Method for Use)

When the cap of the present invention is used, it is used by attaching to a container in which medical solutions are ejected by the needle. In addition, such an infusion bottle that has at least the bottle body for containing the medical solutions and the ejecting part for ejecting the medical solutions by the needle can be prepared. By this, the sealing property of said infusion bottle can be improved.

EXAMPLES

Example 1

A cap-molding intermediate with a plug inserted in the side circuit part of the outer frame was attached upside down to the lower die mold, and using the upper die mold having a ringed protrusion with the embodiment shown in FIG. 10(a), the medical cap of the Example 1 of the embodiment shown in FIG. 1 was molded by the two-color molding that molds the outer frame by the extrusion molding. For information, the plug has a shape that is convex downward with a columnar protrusion part at the position that includes the center of the wetted surface, and as a thermoplastic elastomer material, styrene-based elastomer was used. As a material of the outer frame, polyolefin was used both for the peripheral part and for the leg part. Further, such a plug was used that was molded by the compression molding method and such a peripheral part of the outer frame was molded by the extrusion molding.

Comparative Example 1

Using the same molding intermediate as used in the Example 1, this molding intermediate was attached to the lower die mold as in the Example 1, and using the upper die mold with a columnar protrusion instead of using the ringed protrusion used in the Example 1, the medical cap of the Comparative Example 1 was molded by the two-color molding that molds the outer frame with pressure not applied to said plug from the leg part of said outer frame by extrusion molding with the embodiment shown in FIG. 11.

(Tests on Holding Power of Puncture Needles)

40 samples of the medical caps for Example 1 and Comparative Example 1 were prepared, respectively and the tests on holding power of puncture needle were conducted when the needle was stuck in the plug. Each of the medical caps were attached to an extension and compression tester and after vertically sticking the below mentioned puncture needle attached to the above mentioned tester at the central part of the plug of the medical caps, said puncture needle was raised at the rate of 200 mm/min. and the force at the time of said puncture needle falls off from said plug was measured. As the puncture needles, 16 G metal needles and plastic needles were used, and the tests were conducted for each of 20 samples thereby obtaining maximum values, minimum values, and average values. The result is shown in Table 1.

TABLE 1

| Kinds of puncture needles (bottle needles) | | Holding power of puncture needle (unit: kgf) | | | | | | | | | | | | |
|---|---|---|---|---|---|---|---|---|---|---|---|---|---|---|
| | | | | | Measurement value of each sample (No. 1 to 20) | | | | | | | | | |
| | | Average value | Maximum value | Minimum value | 1 / 11 | 2 / 12 | 3 / 13 | 4 / 14 | 5 / 15 | 6 / 16 | 7 / 17 | 8 / 18 | 9 / 19 | 10 / 20 |
| 16 G metal needles | Example 1 | 1.370 | 1.42 | 1.29 | 1.40 / 1.38 | 1.39 / 1.4 | 1.37 / 1.32 | 1.42 / 1.37 | 1.35 / 1.36 | 1.32 / 1.37 | 1.40 / 1.29 | 1.42 / 1.36 | 1.35 / 1.35 | 1.35 / 1.42 |
| | Comparative Example 1 | 1.232 | 1.28 | 1.18 | 1.21 / 1.25 | 1.22 / 1.26 | 1.27 / 1.18 | 1.26 / 1.2 | 1.25 / 1.24 | 1.23 / 1.25 | 1.28 / 1.19 | 1.24 / 1.225 | 1.19 / 1.24 | 1.20 / 1.23 |
| Plastic needles | Example 1 | 2.101 | 2.31 | 1.81 | 2.23 / 1.81 | 1.94 / 2.17 | 2.12 / 1.91 | 2.21 / 2.28 | 1.98 / 1.85 | 2.05 / 2.14 | 2.14 / 2.02 | 2.28 / 2.15 | 1.99 / 2.31 | 2.18 / 2.25 |
| | Comparative Example 1 | 1.652 | 1.92 | 1.16 | 1.74 / 1.67 | 1.61 / 1.78 | 1.89 / 1.92 | 1.74 / 1.66 | 1.16 / 1.54 | 1.52 / 1.72 | 1.69 / 1.41 | 1.81 / 1.69 | 1.74 / 3.38 | 1.75 / 1.62 |

(Tests on Liquid Leakage of Puncture Needles)

Regarding the medical caps of the Example 1 and the Comparative Example 1, liquid leakage tests (1) after removal of needles and (2) after the operation of mixed injection were conducted.

(1) Liquid Leakage Test after the Removal of Needles

Figure 13:
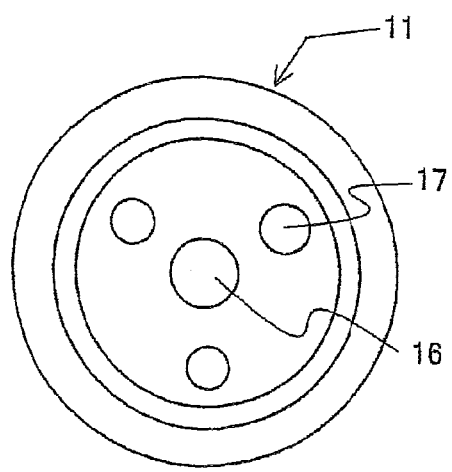
FIG. 13 is a schematic view of a needle stuck surface of the medical cap.

The disinfected medical caps of Example 1 and Comparative Example 1 were attached to the pressure cans for testing, respectively. To the attached medical caps, on intravenous drip infusion position 16 that is the vicinity of the center of the medical cap attached (refer to the schematic view of the needle stuck surface of the plug of FIG. 13), a connecting tube 70 (trade name "TC-00503B" manufactured by Terumo Corporation) was punctuated and was left for four hours. And then the needle was removed and liquid leakage was examined right after the removal of the needle until 30 seconds later and regarding the medical caps with the liquid leakage continuing over 30 seconds, the dripping amount during the 30 seconds was examined (test (1)-A).

Further, the amount of liquid leakage right after the removal of the needle was examined by the same method as in said test (1)-A except that the punctuating apparatus was changed to an infusion liquid set (trade name "TK-A400LK", manufactured by Terumo Corporation). (Test (1)-B)

Figure 12A:
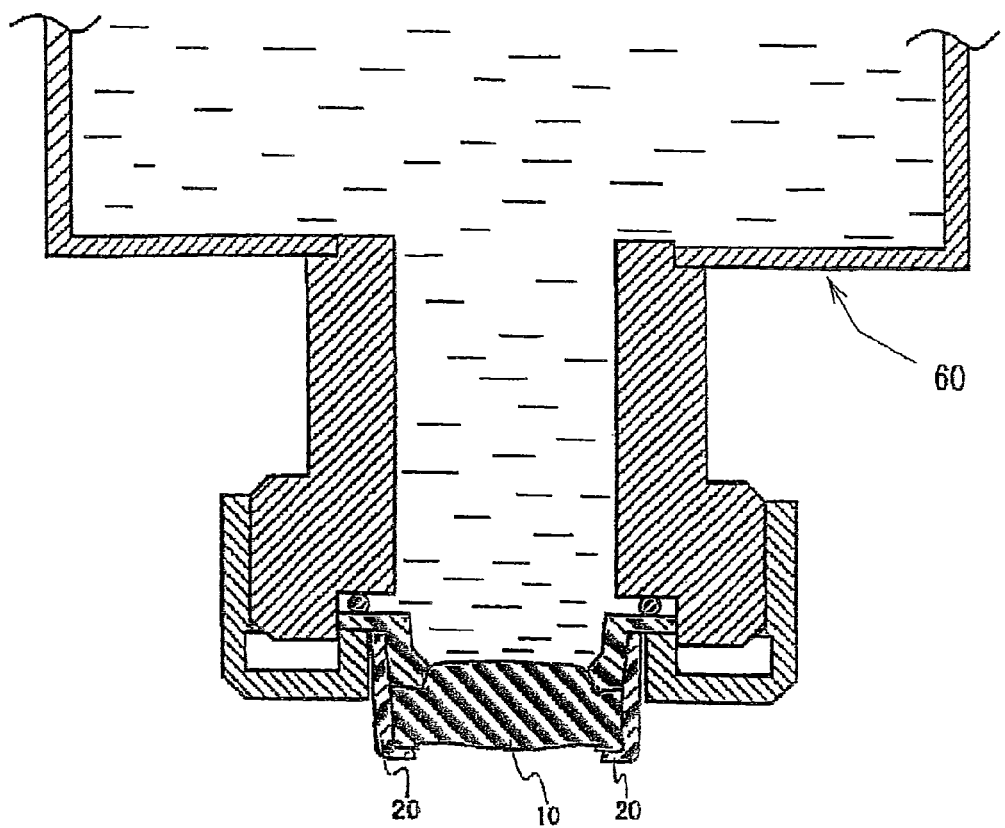
FIG. 12 (a) is a schematic view of a vertical cross section of the medical cap attached to a pressure can for testing.
Figure 12B:
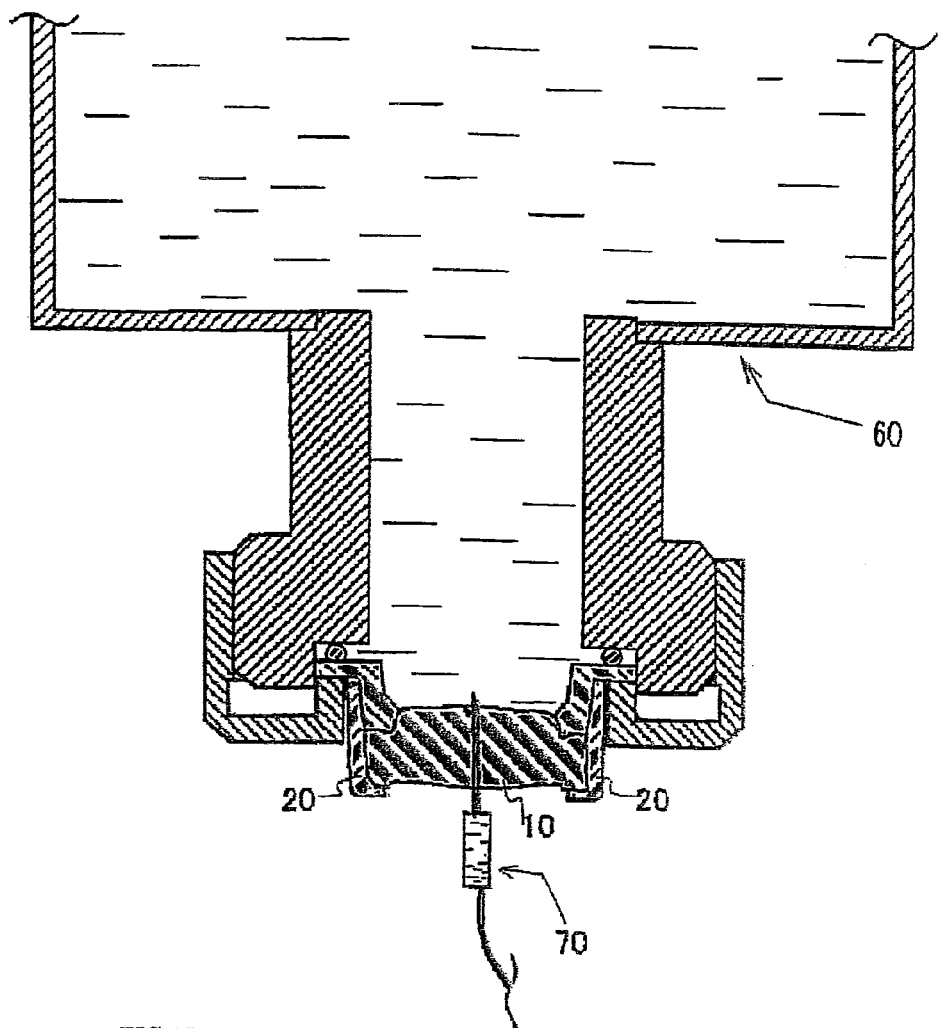

FIG. 12(a) shows the schematic view of a vertical cross section of the medical cap that was attached to the pressure cans for testing. FIG. 12(b) is the schematic view of a vertical cross section showing that the connecting tube is punctuated on the medical cap attached and the liquid leakage test of the above mentioned (1)-A is conducted.

The results of the liquid leakage tests of the above mentioned (1)-A and (1)-B are shown in Table 2. The number of samples is 300 for Example 1, and 300 for the Comparative Example 1, respectively. Further, the examination criteria are as follows.

A: No leakage

B: No dripping although the generation of aqueous droplet was observed

C: Dripping but over within 30 seconds

D: Dripping for more than 30 seconds and the dripping amount during said 30 seconds was less than 2.0 g E: Dripping for more than 30 seconds and the dripping amount during said 30 seconds was not less than 2.0 g.

TABLE 2

| Tests | Kinds of caps | Evaluation | | | | |
|---|---|---|---|---|---|---|
| | | A | B | C | D | E |
| (1)-A Connecting tube | Example 1 | 296 | 4 | 0 | 0 | 0 |
| | Comparative Example 1 | 225 | 23 | 33 | 7 | 12 |
| (1)-B Infusion liquid set | Example 1 | 300 | 0 | 0 | 0 | 0 |
| | Comparative Example 1 | 253 | 38 | 9 | 0 | 0 |

(2) Test on Liquid Leakage after the Mixed Injection Operation

Disinfected medical caps of Example 1 and Comparative Example 1 were attached to the pressure can for testing as shown in FIG. 12 (a), respectively. To the attached medical caps, on the mixed injection position 17 (refer to the schematic view of the needle stuck surface of the plug of FIG. 13) that is in the vicinity of periphery, an 18 G injection needle with 10 ml of water filled in the syringe was vertically punctuated and then in the diagonally wrenched state by about 30° from this state, water in the syringe was restored to the vertical direction after repeating injection and suction three times and the needle was removed. Further, replacing the needle by the new one, said operation was repeated once again and the amount of the liquid leakage was measured right after the second removal of the needle for 1 hour. The amount of liquid leakage was measured.

The results of the tests on the liquid leakage in the above mentioned (2) are shown in Table 2. The number of the sample is 300 for Example 1 and 300 for Comparative Example 1. And the evaluation criteria are as follows.

A: No dripping was observed

B: No dripping although the generation of aqueous droplet was observed

C: 1 to 3 drops fall

D: The dripping amount is less than 2.0 g

E: The dripping amount is not less than 2.0 g

TABLE 3

| Tests | Kinds of caps | Evaluation | | | | |
|---|---|---|---|---|---|---|
| | | A | B | C | D | E |
| (2) 18 G injection needle | Example 1 | 300 | 0 | 0 | 0 | 0 |
| | Comparative Example 1 | 74 | 23 | 49 | 84 | 70 |

Since pressure of horizontal direction component can be applied to the plug while maintaining the contact in a non-fused state between the side surface part of the plug and the inner wall of the side circuit part with the medical caps of the present invention, great improvement effect can be shown on important characteristics of medical caps including improvement in a re-sealing property and prevention of removal of needles.

The medical caps of the present invention can be used as the caps of containers used in the medical field such as medicine bottles, blood collecting bottles, and the like other than for the uses as caps of chemical bottles, infusion container bottles that require a sealing property.

What is claimed is:

1. A molding method of a medical cap of an infusion container bottle capable of ejecting a medication solution from the infusion container bottle by a puncture needle, the medical cap comprising a plug of a thermoplastic elastomer resin and an outer frame of a synthetic resin, wherein:

said plug comprises a needle stuck surface for the puncture needle, a wetted surface contacting the medical solution filled in the infusion container, and a side surface part that is positioned between said needle stuck surface and said wetted surface; and said outer frame comprises:
a side circuit part holding the side surface part of said plug from a side surface direction by an inner wall thereof, and a protrusion of the side circuit part being formed by extending downward beyond a contact position with the wetted surface of said plug, and
a leg part whose upper part is fused with a peripheral part of the wetted surface of said plug and whose outer side surface is fused with the inner surface of the protrusion of the side circuit part of said outer frame, the method comprising, in chronological order, the steps of:
either molding or inserting the outer frame in a lower die mold;
subsequently preparing a cap-molding intermediate with said plug inserted in the side circuit part of said outer frame, wherein an outer-most circumference diameter of said plug is not larger than an inner-most circumference diameter of the side circuit part of said outer frame prior to the plug being held by the side circuit part of the outer frame;
then, said cap-molding intermediate being held in the lower die mold with the needle stuck surface for the puncture needle down, deforming said cap-molding intermediate into a push-up state by a ringed protrusion of an upper die mold, thereby forming a columnar protrusion part of the cap-molding intermediate, such that a peripheral portion of a lower bottom face of the plug is deformed into the push-up state, and a portion of the columnar protrusion part of the cap-molding intermediate is deformed to have an inclination downward to a circle center;

then, while the ringed protrusion of the upper die mold maintains the deformation in the push-up state, molding the leg part of said outer frame from outside of the ringed protrusion of said upper die mold; and while the leg part of said outer frame maintains the pressurized state with the molded leg part of said outer frame, fusing the outer side surface of the leg part of said outer frame with the inner wall of the protrusion of the side circuit part of said outer frame and fusing the upper part of the leg part of said outer frame with the peripheral part of the wetted surface of said plug, such that said peripheral part of the plug is deformed causing the wetted surface to bow from a point of fusion between the upper part of said leg part and the peripheral part of said wetted surface to a center of the wetted surface, wherein a protruding amount h, which is defined as a vertical distance between a point where contact between the plug and the leg part of the outer frame terminates and the circle center of the wetted surface, is 0.1 mm to 3.0 mm.

2. The molding method of claim 1, wherein preparing said cap-molding intermediate comprises inserting said plug in the side circuit part of the outer frame in a non-contracted state.

3. The molding method of claim 2, wherein deforming said cap-molding intermediate into the push-up state comprises applying push-up pressure to the wetted surface of the non-contracted plug with said ringed protrusion of the upper die mold.

4. The molding method of claim 2, wherein deforming said cap-molding intermediate into the push-up state comprises pushing said ringed protrusion of the upper die mold into the wetted surface of the non-contracted plug.

5. The molding method of claim 1, wherein after the leg part is molded, the plug is maintained in a non-contracted state by the molded leg part.

6. A molding method of the medical cap of an infusion container bottle capable of ejecting a medication solution from the infusion container bottle by a puncture needle, the medical cap comprising a plug of a thermoplastic elastomer resin and an outer frame of a synthetic resin, wherein:

said plug comprises a needle stuck surface for the puncture needle, a wetted surface contacting the medical solution filled in the infusion container, and a side surface part that is positioned between said needle stuck surface and said wetted surface; and said outer frame comprises:

a side circuit part holding the side surface part of said plug from a side surface direction by an inner wall thereof, and a protrusion of the side circuit part being formed by extending downward beyond a contact position with the wetted surface of said plug, and a leg part whose upper part is fused with a peripheral part of the wetted surface of said plug and whose outer side surface is fused with the inner surface of the protrusion of the side circuit part of said outer frame, the method, comprising, in chronological order, the steps of:

either molding or inserting the outer frame in an upper die mold;

subsequently preparing a cap-molding intermediate with said plug inserted in the side circuit part of said outer frame, wherein an outer-most circumference diameter of said plug is not larger than an inner-most circumference diameter of the side circuit part of said outer frame prior to the plug being held by the side circuit part of the outer frame;

then, said cap-molding intermediate being held in the upper die mold with the needle stuck surface for the puncture needle up, deforming said cap-molding intermediate into a push-down state by a ringed protrusion of said lower die mold, thereby forming a columnar protrusion part of the cap molding intermediate, such that a peripheral portion of an upper bottom face of the plug is deformed into the push-down state and a portion of the columnar protrusion part of the cap-molding intermediate is deformed to have an inclination upward to a circle center;

then, while the ringed protrusion of the lower die mold maintains the deformation in the push-down state, molding the leg part of said outer frame from outside of the ringed protrusion of said lower die mold; and while the leg part of said outer frame maintains the pressurized state with the molded leg part of said outer frame, fusing the outer side surface of the leg part of said outer frame with the inner wall of the protrusion of the side circuit part of said outer frame and fusing the lower part of the leg part of said outer frame with the peripheral part of the wetted surface of said plug, such that said peripheral portion of the plug is deformed causing the wetted surface to bow from a point of fusion between the upper part of said leg part and the peripheral part of said wetted surface to a center of the wetted surface, wherein a protruding amount h, which is defined as a vertical distance between a point where contact between the plug and the leg part of the outer frame terminates and the circle center of the wetted surface, is 0.1 mm to 3.0 mm.

7. The molding method of claim 6, wherein preparing said cap-molding intermediate comprises inserting said plug in the side circuit part of the outer frame in a non-contracted state.

8. The molding method of claim 7, wherein deforming said cap-molding intermediate into a push-down state comprises applying push-down pressure to the wetted surface of the non-contracted plug with said ringed protrusion of the lower die mold.

9. The molding method of claim 7, wherein deforming said cap-molding intermediate into a push-down state comprises pushing said ringed protrusion of the lower die mold into the wetted surface of the non-contracted plug.

10. The molding method of claim 6, wherein after the leg part is molded, the plug is maintained in a non-contracted state by the molded leg part.

\* \* \* \* \*